United States Patent [19]

Gonsior

[11] Patent Number: 5,181,690
[45] Date of Patent: Jan. 26, 1993

[54] SHUT-OFF VALVE

[75] Inventor: Wolfgang Gonsior, Lindau-Bodolz, Fed. Rep. of Germany

[73] Assignee: XOMOX International GmbH & Co., Linday, Fed. Rep. of Germany

[21] Appl. No.: 741,957

[22] Filed: Aug. 8, 1991

[30] Foreign Application Priority Data

Aug. 16, 1990 [DE] Fed. Rep. of Germany ....... 4025832

[51] Int. Cl.⁵ .................................................. F16K 1/22
[52] U.S. Cl. ..................................... 251/172; 251/306
[58] Field of Search ....... 251/172, 306, 3.4 G–3.4 PT, 251/306

[56] References Cited

U.S. PATENT DOCUMENTS

| | | | |
|---|---|---|---|
| 3,528,448 | 9/1970 | Urban | 251/306 X |
| 3,556,476 | 1/1971 | Haenky | |
| 3,642,248 | 2/1972 | Benware | 251/172 |
| 3,834,663 | 9/1974 | Donnelly | 251/306 X |
| 3,986,699 | 10/1976 | Wucik, Jr. et al. | 251/173 |
| 4,113,268 | 9/1978 | Simmons et al. | |
| 4,335,748 | 6/1982 | Olansen et al. | 251/306 X |

FOREIGN PATENT DOCUMENTS

| | | |
|---|---|---|
| 2811035 | 10/1978 | Fed. Rep. of Germany . |
| 142377 | 6/1980 | Fed. Rep. of Germany . |
| 63-210472 | 1/1988 | Japan . |

*Primary Examiner*—John C. Fox
*Attorney, Agent, or Firm*—Foley & Lardner

[57] ABSTRACT

A shut-off and regulating valve including a housing in which a valve disk is journaled for rotation, especially with double eccentricity. A metal seat ring is associated with a sealing surface of the valve disk. The seat ring includes an integral seat holding portion and has a radially deformable, resilient sealing lip. This sealing lip is permanently deformed radially outwardly by initial closure of the valve disk and contacts the sealing surface of the valve disk in a resiliently elastic manner. The valve has a simplified structure which exhibits improved sealing tightness and reduces the torque necessary to operate the valve.

20 Claims, 2 Drawing Sheets

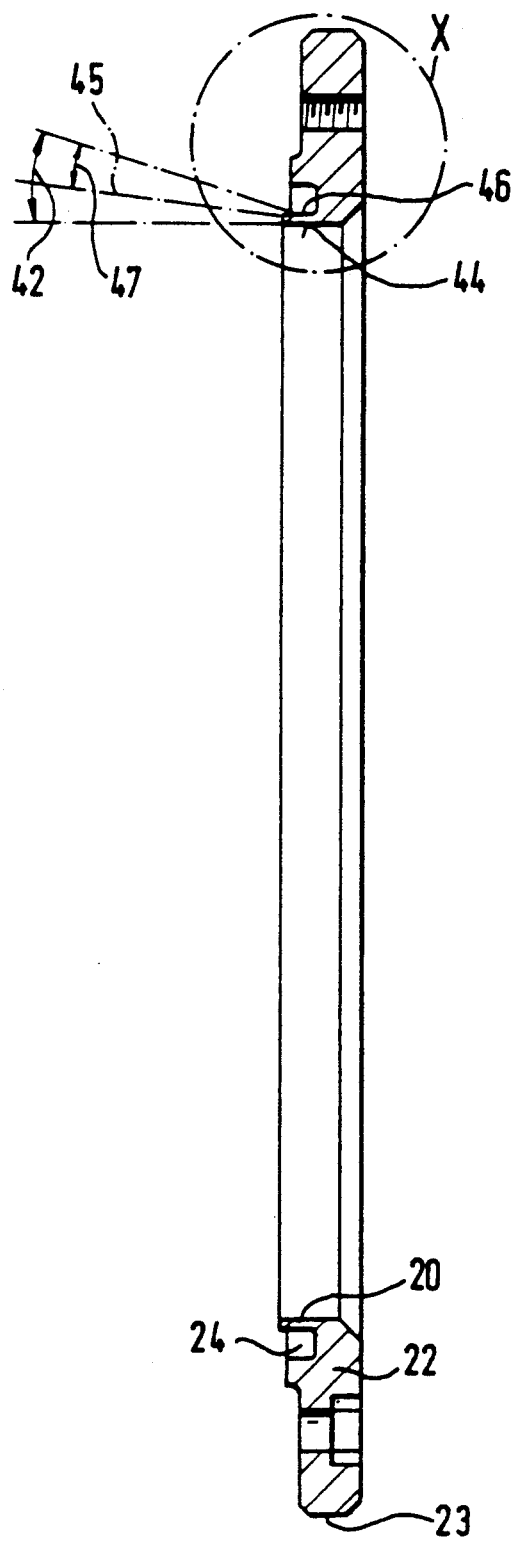
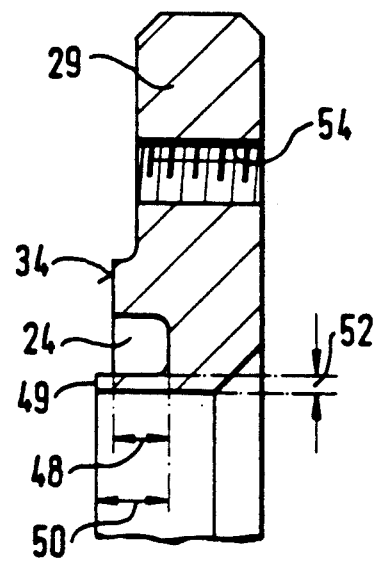
Fig. 3
Fig. 4

SHUT-OFF VALVE

BACKGROUND OF THE INVENTION

This invention relates to a shut-off and regulating valve comprising a housing, a valve disk journaled in the housing, and a seat ring with which the valve disk can be brought into contact.

U.S. Pat. No. 3,968,699 discloses a shut-off valve which has a seat ring with a resilient gasket for normal operation and, in case of damage, especially in a fire, a sealing lip of metal. This metal sealing lip is a component of a seat holding ring with which the seat ring is held in a chamber of the housing. The sealing lip has, in the unloaded state, essentially the same alignment as in the case of a closed valve disk. In the previously known shut-off valve the metal sealing lip by no means suffices to satisfy requirements with regard to the needed sealing action between the sealing surface and the valve disk, and a comparatively high leakage is to be expected. For the proper operation of the shut-off valve in normal operation, the seat ring of resilient material is absolutely necessary, the radial bias being applied by means of an additional resilient ring in order to satisfy the stringent requirements as regards sealing tightness and minimum leakage. The difficulty of manufacturing the previously known shut-off valve is therefore substantial.

Furthermore, a check valve is disclosed in German Democratic Republic Patent No. 142,377, in which the valve disk is journaled in the housing with double eccentricity. In the housing a seat holding ring consisting of metal is fastened, which has a rounded seat surface for the valve disk. The rounded seat surface is a component of an annular internal portion of the seat ring, and the said internal portion is joined to the rest of the seat ring by a more or less radially aligned connecting piece. This connecting piece permits a certain elastic movement of the internal portion with the rounded contact surface when the valve disk is closed. The production of such a seat ring is very difficult because the manufacturing tolerances of various parts must be precisely coordinated with one another if sufficient sealing is to be possible. Also, when the seat ring is installed, the it must be precisely positioned with respect to the valve disk, and thereafter must be precisely secured in the housing by means of the additional seat holding ring. Such adjustment calls for the use of especially qualified personnel and involves appreciable cost. Finally, special measures must be taken to assure that the optimum positioning achieved with a certain probability during assembly will also be reliably maintained in the following period of operation. Even slight shifting of the seat ring due to the forces acting on it would have a very disadvantageous effect on the sealing and, in some cases, would call for quite difficult repairs.

Furthermore, Japanese patent application 63-210,472-A discloses a safety valve which, again, has a sealing ring for normal operation made from an elastomer or a comparable nonmetallic material having a tongue which is aligned substantially radially. By means of an additional spring ring a radial bias is achieved with respect to the outside surface of the valve disk. In case of a fire, the seat ring has an additional sealing lip of metal with which the valve disk comes in contact. As explained above, such a metal sealing lip cannot produce a sufficient sealing in normal operation to satisfy the leak-proof sealing requirements which then apply. This is because comparatively high surface pressures between the seat ring and the valve disk would have to be anticipated, and this can result in disadvantages in regard to the service life and the materials that are used. To enable the required seal to be achieved between the spherical sealing surface of the valve disk and the seat ring, relatively high torques would have to be applied to open and close the valve. The driving means for actuating the valve would therefore have to be constructed sufficiently sturdily.

SUMMARY OF THE INVENTION

It is the object of the present invention to provide an improved shut-off and regulating valve.

A further object of the invention is to provide a shut-off and regulating valve which exhibits an improved seal with a less complex manufacture and design.

It is also an object of the invention to provide a shut-off and regulating valve which reduces the amount of torque required to operate the valve disk.

Another object of the invention is to provide a shut-off and regulating valve in which the number of components required is reduced while assuring high reliability of operation and long service life.

These and other objects of the invention are achieved by providing a shut-off and regulating valve comprising a housing, a valve disk journaled in said housing and having a sealing surface thereon, and a seat ring with which said valve disk can be brought into contact, wherein said seat ring is fastened directly in said housing by means of a seat holding ring portion which is an integral part of said seat ring, and said seat ring is provided with a radially deformable resilient sealing lip which engages said sealing surface of said valve disk under radial bias.

The shut-off and regulating valve according to the invention is characterized by simple design and can be manufactured at considerably reduced cost. The metal seat ring is integrated with the holding ring and is thus made in one piece. In comparison with a separate seat ring, the special contact surfaces of the holding ring and housing for gripping the seat ring are eliminated. The seat ring integrated with the seat holding ring in accordance with the invention has a substantially simpler geometry which enables the machining and finishing time to be considerably reduced. The seat ring has a sealing surface which is produced by creating an annular relief groove in the seat ring. After it is made the sealing lip at first has an initial alignment with respect to the longitudinal axis and then is deformed plastically at a given angle and then assumes a second alignment with respect to the longitudinal axis. In the preparation of the seat ring and sealing lip, therefore, it is not necessary to satisfy any particularly stringent requirements regarding the shape of the sealing lip.

No separate seat holding ring is necessary with respect to which the seat ring would have to be aligned in the housing. Instead, the seat ring and the seat holding ring form an integral unit in which the said sealing lip is likewise integrated. The sealing lip is made from the integrated seat ring, while observing the usual manufacturing tolerances and accuracy, and its adaptation to the geometry of the valve disks as necessary for a good seal and minimal leakage is achieved by plastic deformation of the sealing lip. In this manner minimum leakage is also assured even for normal operation, which in the case of the previously known shut-off valves was always achieved with an additional sealing ring of nonmetallic material. Due to the automatic adaptation and alignment of the sealing lip by the plastic deformation of the sealing lip proposed according to the invention, an excellent seal is achieved without the need to apply comparatively high torques to open and close the valve disk. Furthermore, high localized pressures, whether circumferential or axial, are reliably minimized by the plastic deformation of the sealing lip, thereby assuring a long useful life of the shut-off and regulating valve.

After manufacture the sealing lip is substantially cylindrical, such that the cylindrical inside surface and/or the cylindrical outside surface are substantially coaxial with the longitudinal axis of the valve. The result is a considerable simplification of the manufacturing process since no complex tools and/or laborious working procedures are needed to produce the sealing lip and the relief groove. Instead, the relief groove as well as the sealing lip can be manufactured without difficulty using conventional machinery and tools. Upon closing, the resilient sealing lip is deformed radially within its resilient range and urged against the sealing surface of the valve disk. This results in contact of the sealing lip with the sealing surface under a radial bias over a comparatively large surface, and the specific surface pressure between sealing lip and sealing surface is appreciably reduced.

Furthermore, the pressure of the medium present in the relief groove reinforces the radial sealing force in an especially desirable manner. The inside surface and likewise the outside surface of the sealing lip are made of a size corresponding to requirements. The pressure of the medium acts in an especially desirable manner radially and externally against the outside surface of the sealing lip, a slightly lesser radial component of force being active in accordance with the taper angle of the sealing surface of the valve disk. The sealing lip consisting entirely of metal, like the seat ring, is forced resiliently radially outwardly when the valve disk closes and is brought into contact with the sealing surface of the valve disk with a radial bias, thereby automatically compensating inaccuracies, tolerances and above all any axial shifting due to eccentricity, in an especially desirable manner. The sealing lip can best project with its edge axially to a given extent beyond the axial abutment or end face of the seat ring. The axial length of the sealing lip is by a given factor greater than the depth of the relief groove and the extent of its spring action can be adapted and can be specified according to requirements in an especially expedient manner by specifying the said length beforehand.

Not until after the seat ring has been installed in the valve, is a plastic deformation of the metal sealing lip performed, especially by means of the valve disk, in such a manner that the sealing lip is similar to a taper in relation to the longitudinal axis. In this plastic deformation the sealing lip is precisely aligned with the geometry of the spherical sealing surface of the valve disk, thereby compensating manufacturing and installation tolerances in a virtually ideal manner, both in the valve disk and in the seat ring. Consequently the torque required for shutting and/or opening the flow path is substantially reduced. This self-alignment and adjustment of the sealing lip by means of the valve disk in accordance with the invention is especially important in such valves having eccentric or doubly eccentric valve disks.

It is to be noted that, in doubly eccentric pivoting, the valve disk on the one hand is offset from the center line of the sealing ring and on the other hand is off-center from the longitudinal axis of the pipe. The sealing lip thus conically aligned furthermore has sufficient resilience so that, during operation, the sealing lip is in contact with a radial bias with the sealing surface of the valve disk in a reliably operating manner.

BRIEF DESCRIPTION OF THE DRAWINGS

The invention will be explained in further detail hereinafter with reference to preferred embodiments illustrated in the accompanying drawings in which:

FIG. 3 is an axial section through the seat ring with an integrated sealing lip, before the shut-off and regulating valve is installed in its housing, and FIG. 4 is an enlargement of portion X of FIG. 3.

DETAILED DESCRIPTION OF PREFERRED EMBODIMENTS

Figure 1:
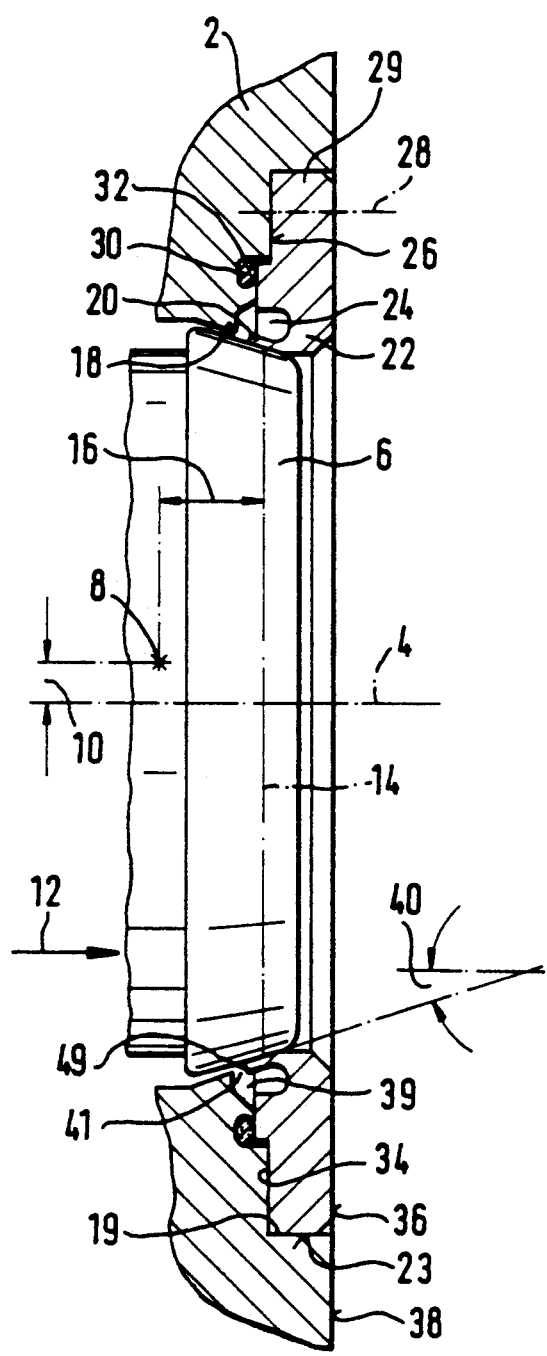
FIG. 1 is a fragmentary axial section with the valve disk in the closed position.

FIG. 1 is a fragmentary axial longitudinal section through a housing 2 of a shut-off and regulating valve according to the invention. In housing 2, which has a longitudinal axis 4, a valve disk 6 is disposed for rotation about an axis 8. As can be seen from FIG. 1, axis 8 is perpendicular to the plane of the drawing and lies at a distance 10 off the center of the longitudinal axis 4. In the position shown, the valve disk 6 shuts off the flow of a medium, the direction of flow being indicated by the arrow 12. The broken line 14 indicates a sealing center line from which the axis 8 has an offset 16. Valve disk 6 is thus arranged with a double eccentricity in housing 2. Valve disk 6 is provided on its outer circumference with a curved or rounded sealing surface 18 which is in sealing contact with a sealing lip 20 of a seat ring 22. The seat ring 22 is received in an annular recess 26 of housing 2 having a centering surface 19. The centering surface 19 is particularly designed as an annular cylindrical surface coaxial to the longitudinal axis 4. Centering surface 19 is in sliding contact with the corresponding outer surface 23 of seat ring 22. When the valve is assembled, the seat ring is simply placed in the recess, so that a definite alignment of the seat ring with the housing 2 is automatically achieved by means of the centering surface 19, and complex positional adjustments are unnecessary.

The sealing lip 20 is an integral part of the seat ring 22 and is produced by creating a relief groove 24 coaxial to the longitudinal axis 4. The seat ring 22 is disposed in the annular recess 26 in the housing 2 and fastened directly to the housing, for example by means of screws which extend along broken lines 28. The radially outer portion 29 of seat ring 22 is provided with bores 54 (Shown in FIG. 4) for the mounting screws and corresponds to the seat holding ring used heretofore. The seat ring 22 is integrated with the seat holding ring and made in one piece therewith.

The sealing lip 20 made in one piece with the seat ring 22 engages the sealing surface 18 of valve disk 6 with radial bias. In contrast to prior art valves, the metal sealing lip 20 integrated into the seat ring 22 is the only seal, and there is no additional sealing ring of nonmetallic material as was common in conventional, prior art shut-off valves. This results in additional advantages in regard to the overall axial length of the shut-off and regulating valve.

When the valve disk 6 is closed, the resilient sealing lip 20 is deformed within its resilient range and pressed against the sealing surface 18. The resulting radial sealing force is reinforced by the pressure of the medium, which is exerted in the relief groove 24 and produces a force component on the sealing lip 20 directed radially inwardly toward the longitudinal axis.

A seal is produced between the housing 2 and the seat ring 22 by means of an annular gasket 30, which preferably consists of or contains graphite. The annular gasket 30 is disposed in an annular groove 32 in the housing 2 such that an axial face 34 of seat ring 22 is in contact with the annular gasket. The other axial face 36 of the seat ring 22 lies in a common radial plane with an axial end face 38 of housing 2.

In the closed position shown in FIG. 1, sealing lip 20 is conically aligned with the longitudinal axis 4 so that it forms a first angle 40 with the longitudinal axis. Depending on the nominal width of the valve, this first angle is between 25 and 10 degrees. Larger angles within this range are used for smaller nominal valve widths. For a nominal width of 80 mm it has been found advantageous to use an angle of about 21 degrees, and for a nominal width of 300 mm, an angle of about 13 degrees.

A recess 39 is provided in housing 2 axially opposite the relief groove 24 such that an annular clearance 41 exists between at the free end of the sealing lip 20 and the housing, so that the pressure of the medium will be exerted in the relief groove 24. The free end of sealing lip 20 extends part way into the recess 39 in housing 2. This results in advantages as regards the axial length of the valve. Even when the axial length of the sealing lip 20 is relatively large, there is no need to increase the length and/or the size of the valve.

Figure 2:
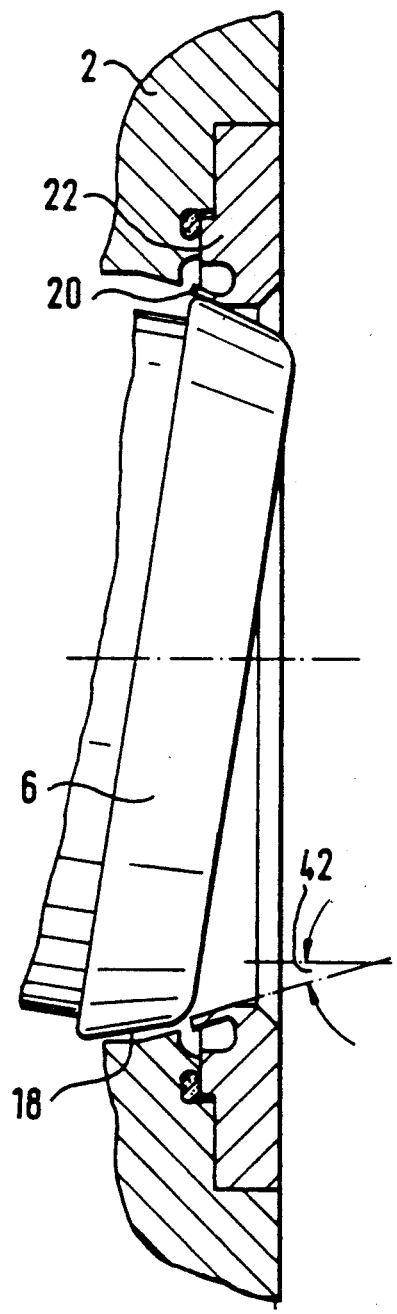
FIG. 2 is an axial section corresponding to FIG. 1, except that the valve disk is in a partially opened position.

FIG. 2 shows the valve disk 6 in a partially opened position. As it can be seen, due to the doubly eccentric mounting of the valve disk 6, its sealing surface 18 is still in contact with the sealing lip 20 in the upper part of the drawing, while in the lower part of the drawing sealing surface 18 is already out of contact with the sealing lip 20. When the valve disk 6 is in the open position, the sealing lip 20 forms a second angle 42 with the longitudinal axis 4, which in accordance with the invention is smaller than the aforementioned first angle 40. This second angle 42 ranges between 23 and 8 degrees of angle, again depending on the nominal width of the valve. For a nominal width of 80 mm, this second angle 42 is advantageously about 19 degrees, while for a nominal width of 300 mm, it is about 12 degrees. In accordance with the angular difference from the closed position shown in FIG. 1, when the valve is closed, the sealing lip 20 is biased radially against the sealing surface 18 of valve disk 6. A good sealing action is achieved by this radial, resilient bias, which is additionally reinforced by the pressure of the medium in the relief groove 24.

FIG. 3 shows the seat ring 22 with the integrated sealing lip 20 in the new state, i.e., before installation in the housing. By the formation of the relief groove 24 in the seat ring 22, the sealing lip 20 was initially produced with a substantially rectangular cross section having a cylindrical inside surface 44 and a cylindrical outside surface 46. Although the arrangement of the inside surface 44 and outside surface 46 as cylindrical surfaces has proven especially desirable from the manufacturing point of view, the inside and outside surfaces can also assume a different orientation with respect to the longitudinal axis 4, as is generally indicated by the line 45.

It is essential to all embodiments that, beginning with the production of an initial orientation of the sealing lip 20, a permanent deformation at a given angle 47 is performed thereafter. This results in optimum adaptation and equalization of manufacturing tolerances, so that during the actual manufacturing less emphasis needs to be assigned to achieving close manufacturing tolerances. Furthermore, after seat ring 22 is installed in recess 26 of housing 2 during assembly of the valve, no additional adjustments need be made, inasmuch as the outside surface 23 lies against the associated centering surface 19, and conventional tolerances for a sliding fit should be observed. On account of such sliding fit the seat ring 22 can be inserted without difficulty into the associated recess in the housing, and then all that remains to be done is to fasten it in the housing. For this purpose no additional seat holding ring is necessary, and the seat ring is fastened in place in a direct and uncomplicated way by means of screws or the like.

After installation in the housing, a permanent shaping of the sealing lip to the second angle 42, described above with reference to FIG. 2, is performed by operating the valve disk. This permanent deformation is substantially greater than the resilient deformation of the sealing lip 20 during operation. The orientation of the sealing lip 20 after manufacture to the line 45 and the establishment of the angle 47 for the plastic deformation of the sealing lip 20 are performed according to the particular requirements, giving foremost consideration to the nominal diameter of the valve and the properties of the material of the seat ring 22.

The above-mentioned plastic deformation of sealing lip 20, which is made of metal, can also be performed in several steps if desired, particularly in the case of the larger valve diameters. Thus a part of the necessary plastic deformation can be performed before the seat ring is installed in the housing, so as to minimize the deformation that is to be performed by the valve disk in accordance with the invention. This makes it possible, especially in the case of the larger valve diameters, to avoid unacceptably great stresses on the valve disk, and especially on its bearings. On the other hand, it has proven to be desirable, especially in the case of small valve diameters, to perform the entire deformation with the valve disk after the seat ring is installed.

The seat ring 22 with the integral sealing lip 20 can be produced without any special difficulty. In particular, there is no need for extreme accuracy regarding the geometry of the sealing lip. Neither is there any need for any reworking of the sealing lip, for example to adapt it to the spherical sealing surface of the valve disk. Due to the permanent deformation of the sealing lip 20 by means of the valve disk after the shut-off and regulating valve has been assembled, manufacturing inaccuracies and the like are compensated for in an especially advantageous manner, with the result that, on the one hand a very good sealing action is achieved, and on the other hand the torque required for closing and opening the valve disk is substantially improved compared to prior art designs. Furthermore, it is especially significant that the sealing lip does not need to be machined to correspond to eccentric or doubly eccentric mounting. Instead, the necessary geometric adaptation that is needed in this regard is performed automatically by the permanent deformation, in particular after installation.

The seat ring 22 and thus also the sealing lip 20 have a modulus of elasticity in the range from 150 to 230 kN/mm², a modulus in the range between 170 kN/mm² and 200 kN/mm² having proven especially effective.

As can be seen from the enlarged representation in FIG. 4, the relief groove 24 has an axial depth 48, while the sealing lip 20 has an axial length 50. In one preferred configuration, the axial depth 48 is between 4 to 6 mm and amounts to about 5 mm. The free end 49 of the sealing lip 20 extends axially by a given factor beyond the contact surface or axial end face 34 of seat ring 22. The length 50 of the sealing lip 20 is larger by a given factor than the axial depth 48 of the relief groove 24. The magnitude of the radial bias force is definitely established in an especially desirable manner by the free length of the spring action of sealing lip 20. The length 50 of the sealing lip 20 ranges between 4 and 8 mm, and is preferably from 5 to 7 mm. The radial thickness 52 of the sealing lip 20 ranges between 0.7 and 1.8 mm, and preferably is about 1.0 to 1.5 mm.

One of the holes 54 for fastening the seat ring 22 in the housing is shown in the radially outer part 29 which corresponds to the holding ring.

The foregoing description and examples have been set forth merely to illustrate the invention and are not intended to be limiting. Since modifications of the described embodiments incorporating the spirit and substance of the invention may occur to persons skilled in the art, the invention should be construed to include all variations falling within the scope of the appended claims and equivalents thereof.

What is claimed is:

1. A shut-off and regulating valve comprising a housing, a valve disk journaled in said housing and having a sealing surface thereon, and a seat ring with which said valve disk can be brought into contact, wherein said seat ring is fastened directly in said housing by means of a seat holding ring portion which is an integral part of said seat ring, said seat ring is provided with a radially deformable resilient sealing lip which engages said sealing surface of said valve disk under radial bias, said seat ring has an axis and is initially formed with said sealing lip having substantially cylindrical inside and outside surfaces parallel to the axis of the seat ring, said sealing lip is subsequently permanently bent radially outwardly through a first angle by initial closure of said valve disk, said sealing lip is elastically deformed radially outwardly through a further angle each time said valve disk is closed, and said first angle is larger than said further angle.

2. A valve according to claim 1, wherein said valve disk is journaled doubly eccentrically in said housing and the sealing engagement between said sealing lip and said valve disk is the sole seal between said valve disk and said seat ring.

3. A valve according to claim 2, wherein said seat ring is composed of metal and has a modulus of elasticity in the range from 150 to 230 kN/mm².

4. A valve according to claim 3, wherein said seat ring has a modulus of elasticity in the range from 170 to 200 kN/mm².

5. A valve according to claim 1, wherein said seat ring is formed with a relief groove in an axial end face thereof radially surrounding said sealing lip, said relief groove has a substantially cylindrical radially outer surface which is substantially parallel to the axis of said seat ring, and said relief groove has a substantially flat bottom surface which lies in a radial plane with respect to the axis of said seat ring.

6. A valve according to claim 5, wherein said sealing lip has a length which is from 1.2 to 2 times as large as the axial depth of said relief groove.

7. A valve according to claim 6, wherein the length of said sealing lip is from 1.4 to 1.7 times the axial depth of said relief groove.

8. A valve according to claim 1, wherein said seat ring is initially formed with said sealing lip having an initial alignment with respect to the longitudinal axis of said housing, and after installation of said seat ring and said valve disk in said housing, said sealing lip is permanently plastically deformed radially outwardly by closure of said valve disk.

9. A valve according to claim 1, wherein said sealing lip is initially formed with a substantially rectangular cross-sectional configuration.

10. A valve according to claim 1, wherein said sealing lip has a free end which is curved radially outwardly by the plastic deformation.

11. A valve according to claim 10, wherein said housing is provided with an annular recess into which said free end of said sealing lip extends with an annular clearance between said free end of said sealing lip and said housing.

12. A valve according to claim 1, wherein said sealing lip has a substantially uniform thickness over its axial length in the range from 0.8 to 1.7 mm.

13. A valve according to claim 12, wherein said sealing lip has a substantially uniform thickness in the range from 1.0 to 1.5 mm.

14. A valve according to claim 1, wherein when said valve disk is in an open position, said sealing lip has an angle of inclination of from 23 to 8 degrees with respect to the longitudinal axis of said seat ring, and when said valve disk is in closed position, said sealing lip has a greater angle of inclination in the range from 25 and 10 degrees with respect to said longitudinal axis.

15. A valve according to claim 14, wherein said angle of inclination in the open position of the valve is in the range from 19 to 12 degrees, and in the closed position of the valve said sealing lip has an angle of inclination in the range from 21 to 13 degrees with respect to said longitudinal axis.

16. A valve according to claim 14, having a nominal valve width 80 mm, wherein said sealing lip has an angle of inclination of about 19 degrees in the open position and an angle of inclination of about 21 degrees in closed position with respect to the longitudinal axis of said seat ring.

17. A valve according to claim 14, having a nominal valve width of 300 mm, wherein said sealing lip has an angle of inclination of about 12 degrees in the open position and an angle of inclination of about 13 degrees in the closed position with respect to the longitudinal axis of said seat ring.

18. A valve according to claim 1, wherein said seat ring is arranged in an annular seat ring recess in said housing and has an axial end face which lies substantially in the same radial plane as an end face of said housing.

19. A valve according to claim 18, wherein an annular gasket groove is formed in said housing adjacent said annular seat ring recess, a sealing gasket composed of or containing graphite is disposed in said gasket groove, and an axial end face of said seat ring sealingly contacts said gasket when said seat ring is arranged in said annular recess.

20. A valve according to claim 19, wherein said housing has an annular sealing lip recess for receiving a free end of said sealing lip, said housing having a stepped contour such that said annular sealing lip recess is arranged radially inwardly of, and substantially in a common radial plane with said annular gasket groove, and said annular seat ring recess has a greater radius than said gasket groove and is arranged in a radial plane axially spaced from the radial plane of said sealing lip recess and gasket groove.

* * * * *